July 29, 1969  F. GAGEUR  3,457,608
CHAIN TRACK ASSEMBLY FOR TENTER CLIPS
Filed Dec. 22, 1965 7 Sheets-Sheet 1
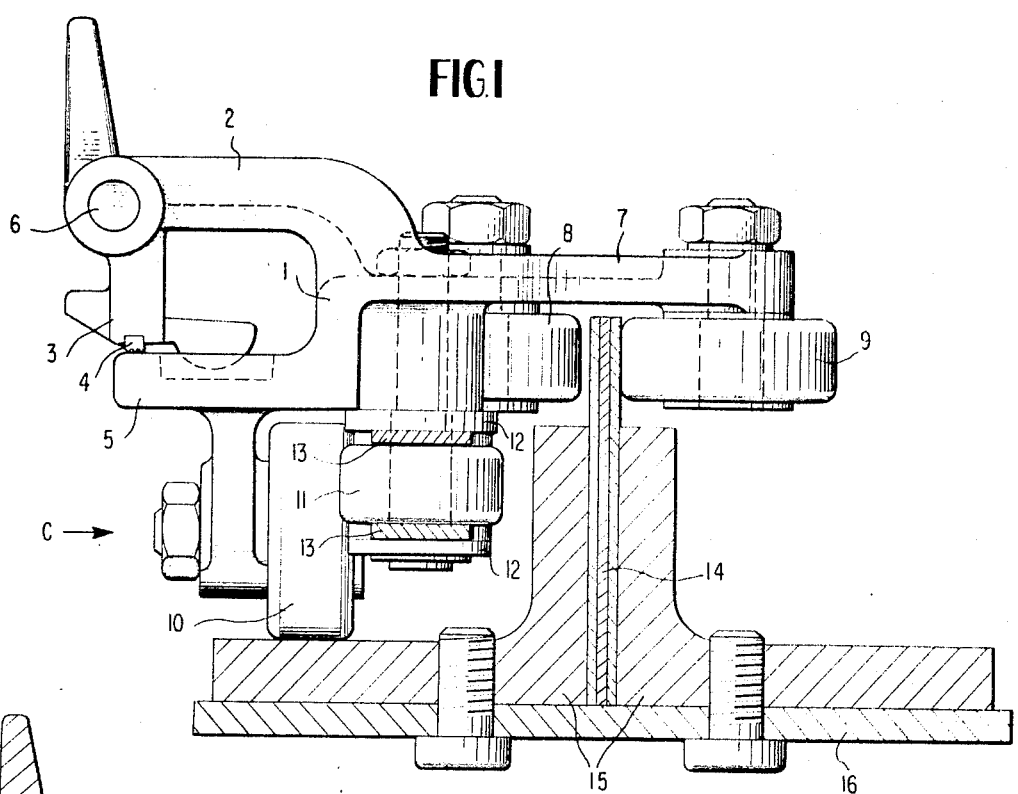
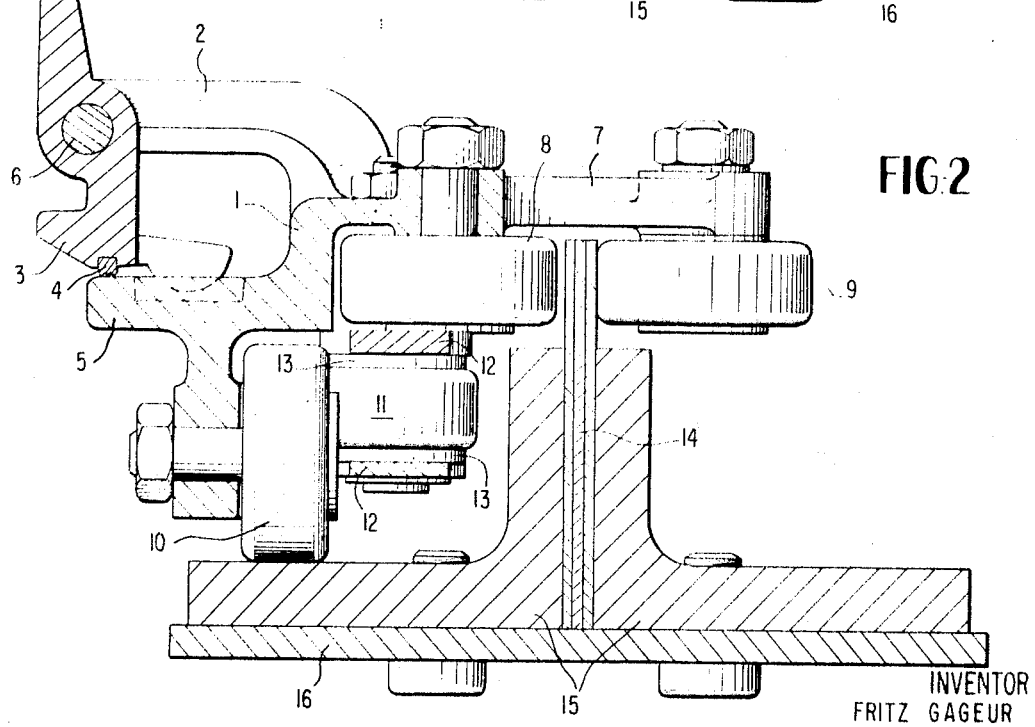
INVENTOR
FRITZ GAGEUR
BY James E. Bryan
ATTORNEY July 29, 1969   F. GAGEUR   3,457,608
CHAIN TRACK ASSEMBLY FOR TENTER CLIPS
Filed Dec. 22, 1965   7 Sheets-Sheet 2
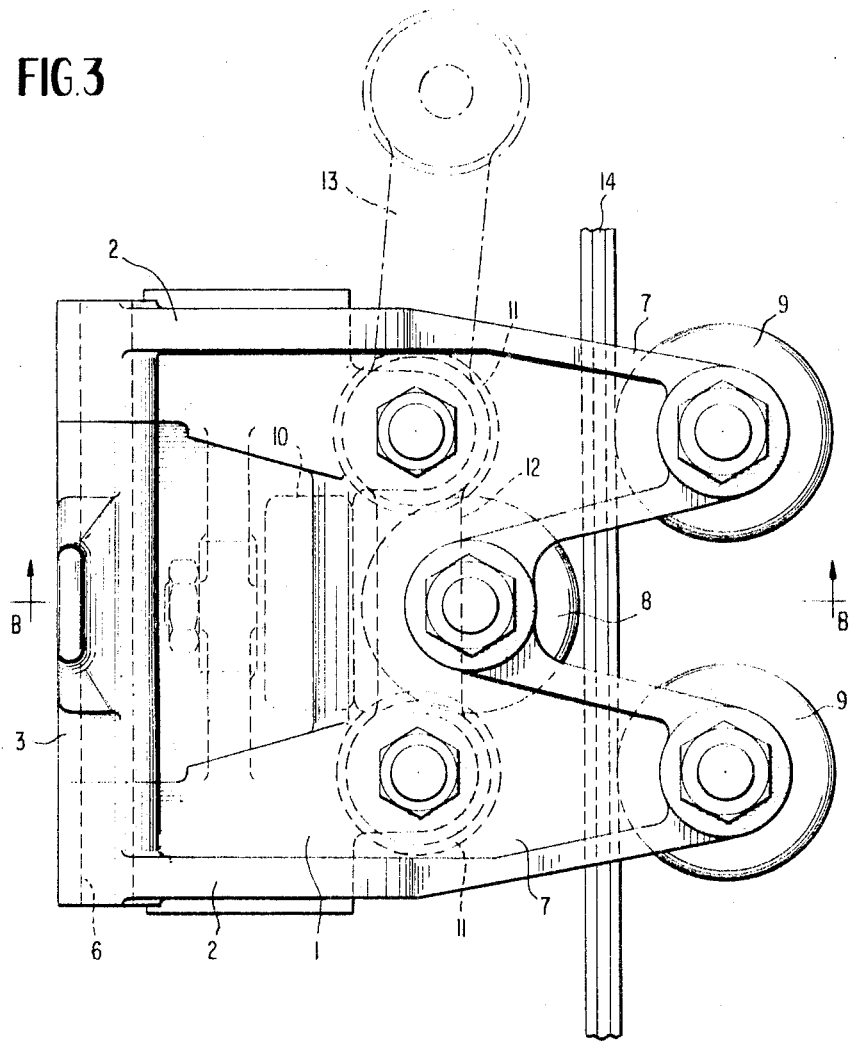
INVENTOR
FRITZ GAGEUR

INVENTOR
FRITZ GAGEUR

BY *James E. Bryan*
ATTORNEY

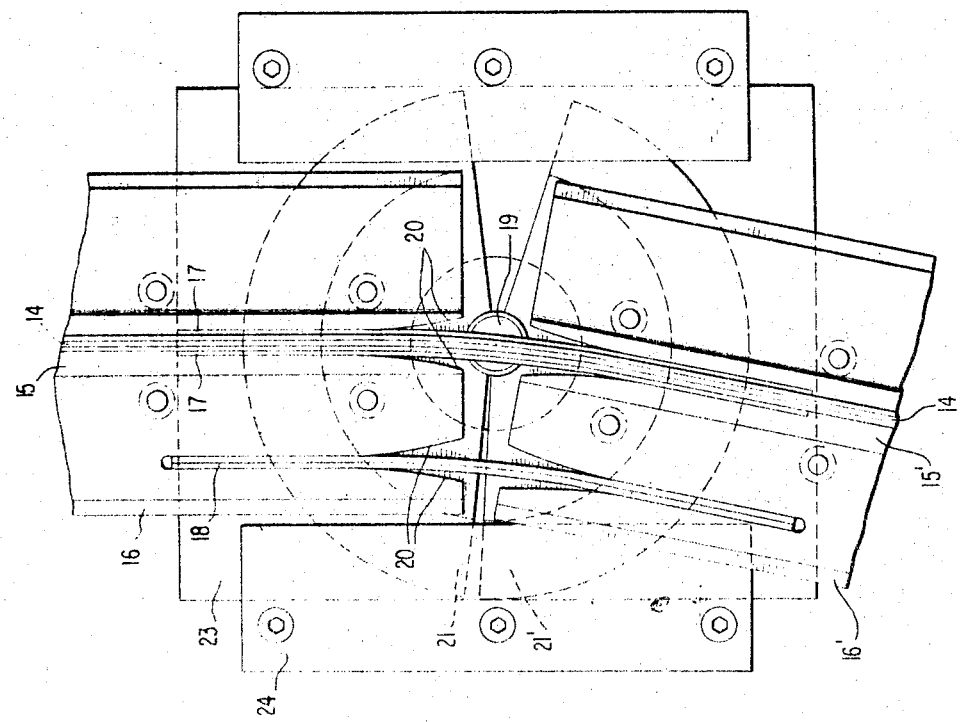
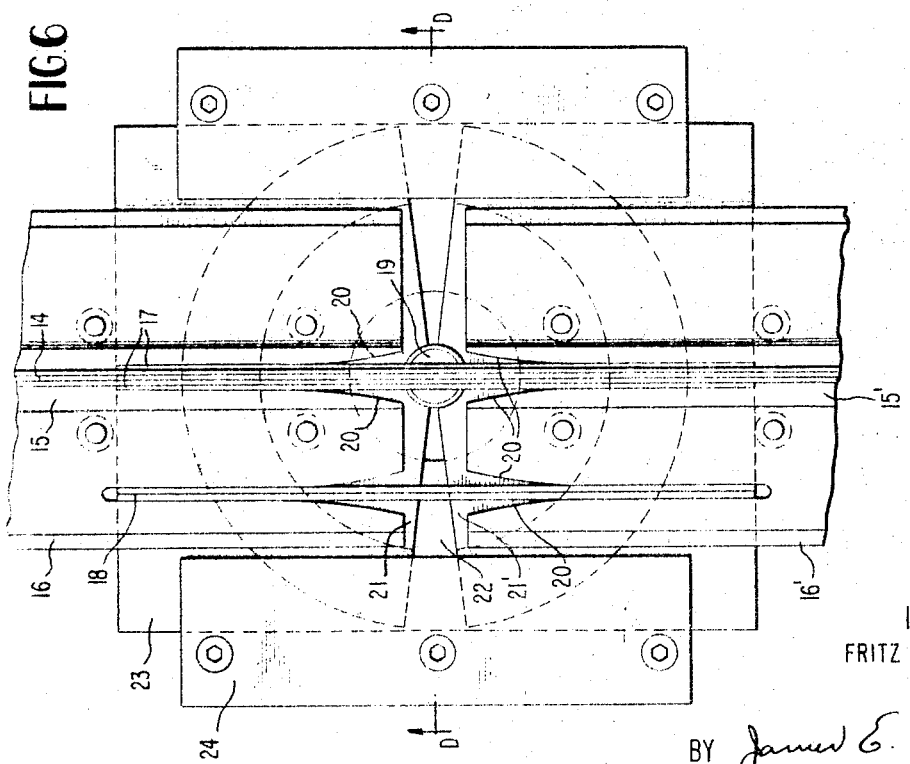

July 29, 1969    F. GAGEUR    3,457,608
CHAIN TRACK ASSEMBLY FOR TENTER CLIPS
Filed Dec. 22, 1965    7 Sheets-Sheet 5

INVENTOR
FRITZ GAGEUR

BY James E. Bryan
ATTORNEY

July 29, 1969  F. GAGEUR  3,457,608
CHAIN TRACK ASSEMBLY FOR TENTER CLIPS
Filed Dec. 22, 1965  7 Sheets-Sheet 6

INVENTOR
FRITZ GAGEUR

BY *James E. Bryan*
ATTORNEY

July 29, 1969  F. GAGEUR  3,457,608
CHAIN TRACK ASSEMBLY FOR TENTER CLIPS
Filed Dec. 22, 1965  7 Sheets-Sheet 7
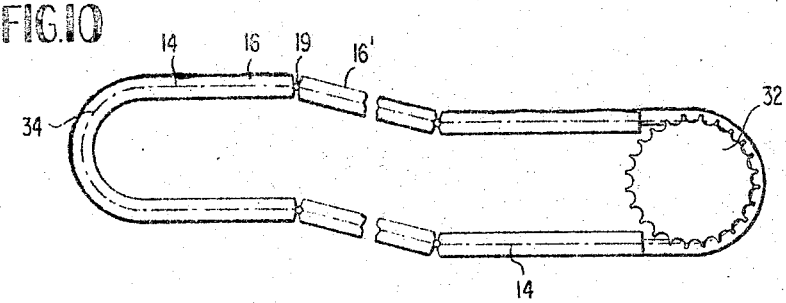
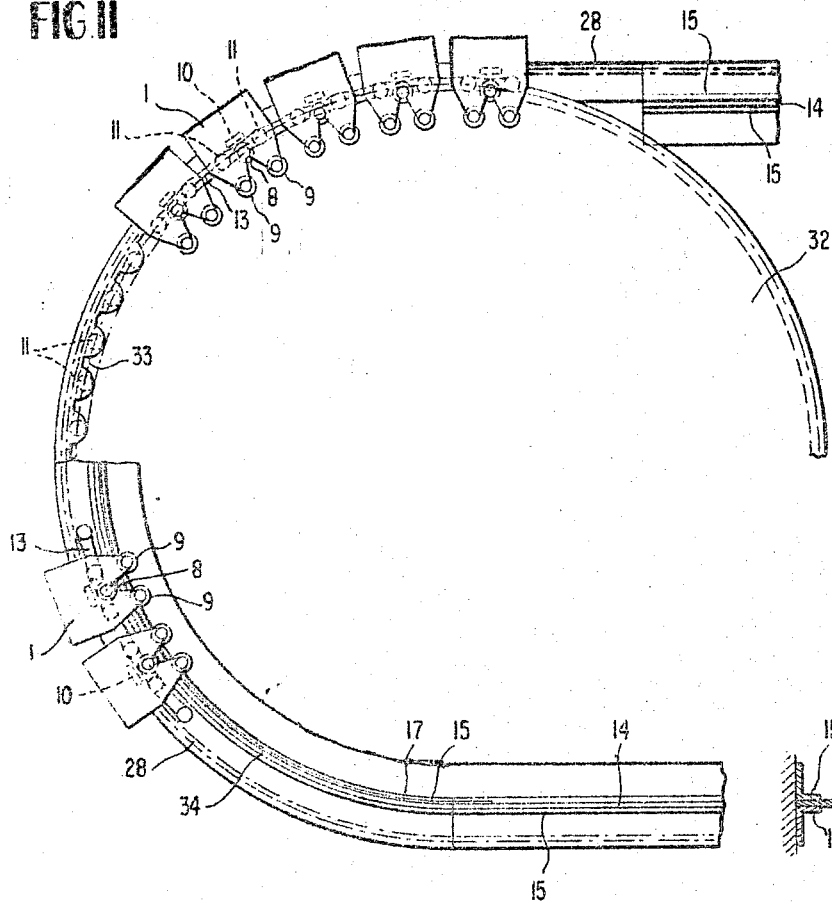
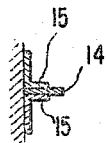
INVENTOR
FRITZ GAGEUR
BY *James E. Bryan*
ATTORNEY

United States Patent Office 3,457,608
Patented July 29, 1969

3,457,608
CHAIN TRACK ASSEMBLY FOR TENTER CLIPS
Fritz Gageur, Lindau, Germany, assignor to Lindauer Dornier Gesellschaft m.b.H., Lindau (Bodensee), Germany, a limited-liability corporation of Germany
Filed Dec. 22, 1965, Ser. No. 515,795
Claims priority, application Germany, Sept. 15, 1965, L 51,631
Int. Cl. D06c *3/04*
U.S. Cl. 26—61      7 Claims

ABSTRACT OF THE DISCLOSURE

This invention relates to a chain track assembly for tenter clips comprising a substantially vertical flexible and jointless guide rail, a plurality of tenter clips guided by the rail and having roller means positioned adjacent the rail on both sides of the latter, and angular clamping members for supporting the guide rail, a horizontal portion of one of the clamping members constituting a supporting surface for a roller on each of the tenter clips.

---

Figure 4:
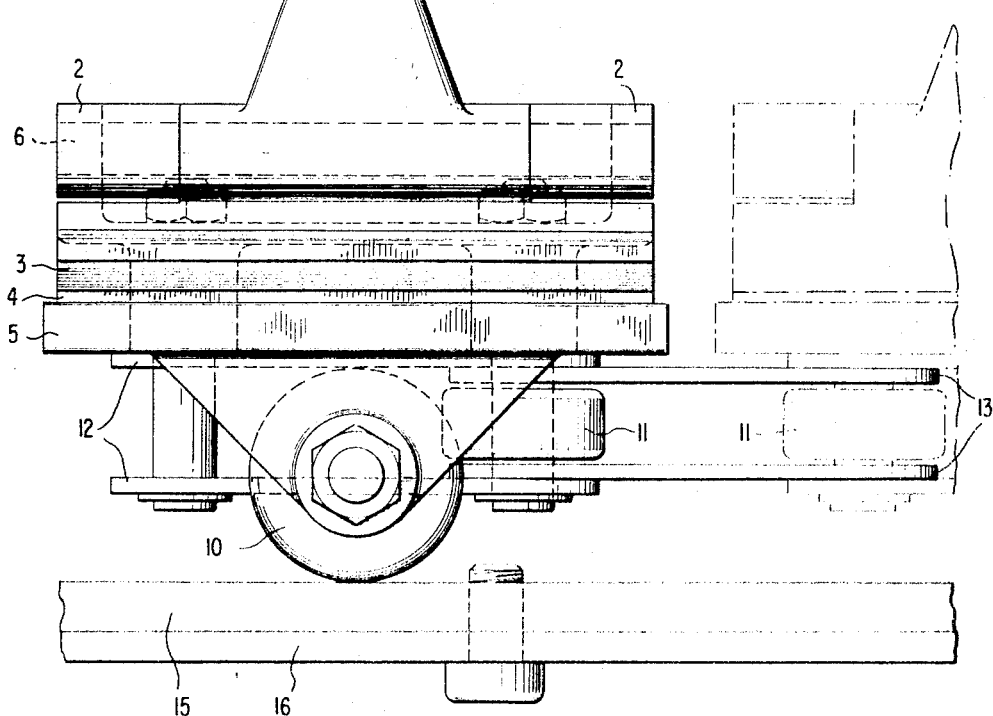

In the textile art and also in the stretching of thermoplastic foils, tentering frames are employed which are provided at the sides thereof with means for gripping the material to be tentered or stretched and for transporting it through the tentering frame. These means consist of so-called tenter clips which are connected to an endlessly moving chain. These clip chains conventionally move in guide rails and are guided at the beginning and at the end of the tentering frame over reversing wheels which also serve to impel the clips. The clip chains travel through several zones of the machine in a manner such that in the first zone they travel in parallel, or substantially in parallel, while in successive zones they diverge apart with respect to each other in order to achieve the necessary tension and transverse stretching. At least in a final zone of the machine, the chain tracks are again parallel. As a result, angles and gaps between successive sections of the chain track are formed in the transition points between the successive zones of the tentering frame.

Conventional clips have the disadvantage that the frictional forces generated in stretching machines increase to such an extent that movement of the clip chain is seriously impaired. Further, difficulties arise with respect to the run of course of the clip chains when the tenter hooks or clips run over the angular points of the guide rails. For this reason, it already has been proposed to provide the tenter clips or hooks with roller bearings in order to alleviate the frictional forces. In a known tenter clip having a roller bearing, the clip, together with the rollers thereof, abuts against the guide rails above and below the clamping point of the material. The guide rails counteract the horizontal forces and are mounted on the side facing the material to be stretched as well as on the side facing away therefrom. The rollers are thus positioned between two parallel guide rails. Additional rollers may be provided, if desired, to counteract the vertical forces, for example the weight of the tenter clips.

The foregoing construction of the roller clips is very sensitive to impacts or shocks generated at the angular points in the clip chain track. For this reason, specific constructions of the guide rails have been proposed in order to subdivide in several places the total angle at the bending or angular points by means of transition elements. These transition elements are so constructed and arranged that the subdivision of the bending angle is automatically adjusted to the proper values at all times. Also, the guide rails at the bending points are so constructed that they interlock and gaps at the bending points are eliminated. However, as a result, the chain track with the guide rails becomes heavy and more complicated. Although in this known construction of the chain track no gap exists, the bending points, even with the repeated subdivision of the entire bending angle, represent a source of potential damage to the rollers, to which every impact or shock is dangerous, particularly when the rollers operate at high speeds of rotation. High rotational speeds are, however, a prerequisite in actual practice. The known roller clips have a further disadvantage in that the rollers running with high rotational speeds over the guide rails are abruptly brought to a standstill when striking against the cogs or teeth of the reversing wheels, as a result of the cogs engaging between the rollers, and are, thereafter, when running into the guide rails of the returning track, again suddenly accelerated to a high speed. The operating conditions are even more severe if, in the course of operation due to variations in the speed of the clip chain, for example as a result of a slackening of the tensional forces, the rollers strike against the rearward guide rail on the returning track. Due to such a change in the point of tangency of the roller from the forward to the rearward guide rail, the roller is also braked and possibly even the direction of rotation is abruptly reversed.

The present invention eliminates the foregoing disadvantages and difficulties and provides a construction of tenter hooks or clips and a guide rail therefor so that no impacts and no undesriable adverse braking of the rollers will occur. In the construction of the present invention, a flexible and jointless vertically-positioned guide rail is employed as a bearing or guiding surface for the rollers of tenter hooks, which rollers counteract the horizontal tensional forces and are positioned adjacent the guide rail on both sides thereof with a small amount of play. Such a jointless and yet flexible guide rail is preferably formed from a plurality of clamped spring steel bands. The construction is advantageously such that the guide rail passes essentially over the central pivot point of the chain track carriers between contiguous sections of the chain track. Such a construction eliminates bending points and, instead, provides rounded-off transitions between two successive sections of the clip chain track. Further, the danger that the rollers can be stressed or acted upon in a different direction of rotation due to variations in the clip chain speed is effectively eliminated. Further, the stresses at the reversing wheels are eliminated since the rollers are no longer employed as chain rollers and separate chain rollers are provided instead for this purpose.

Figure 5:
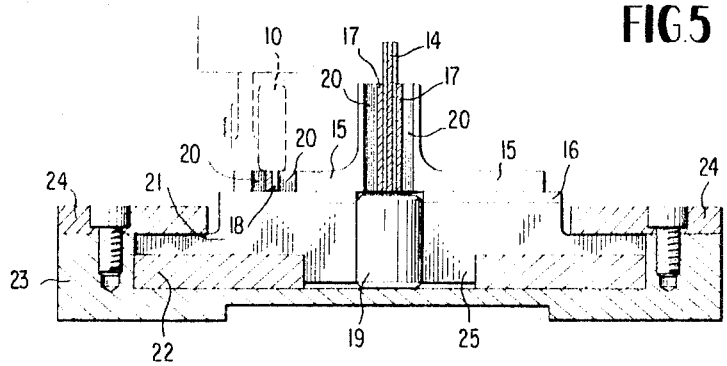
Figure 8:
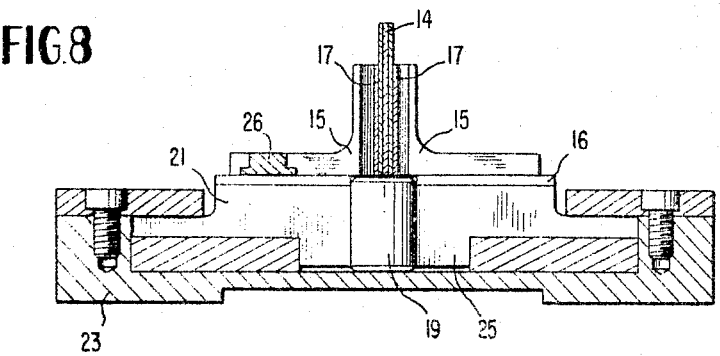
Figure 9:
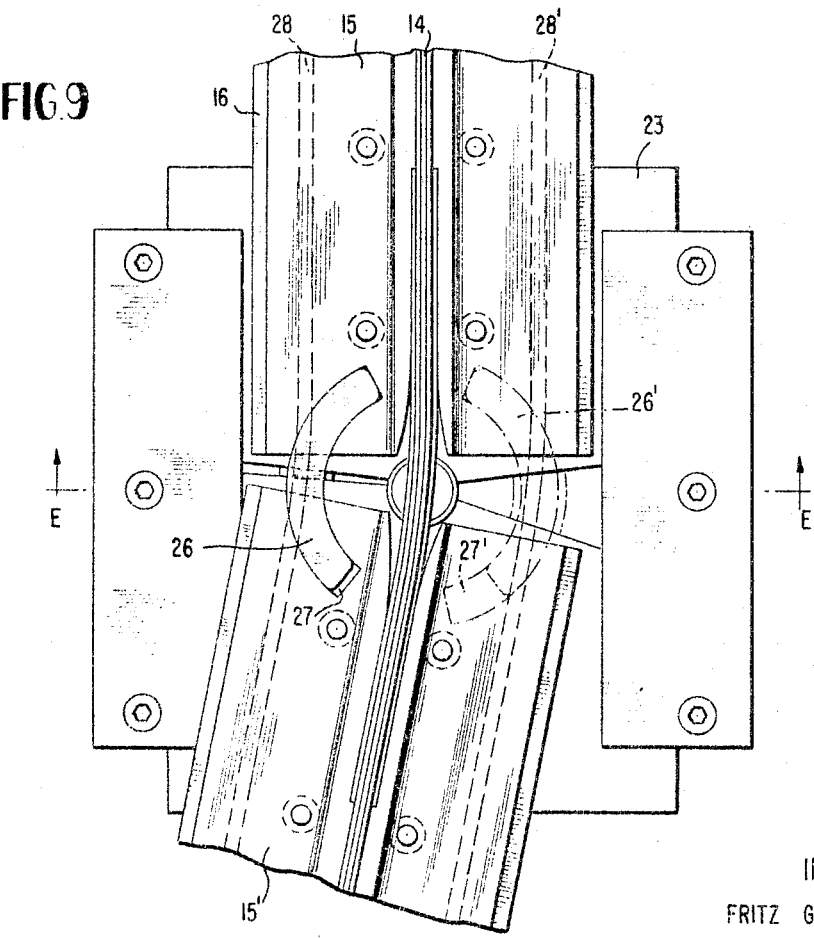
Figure 9A:
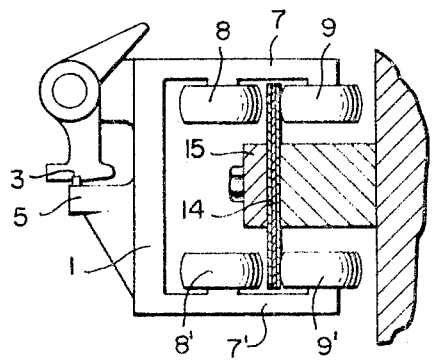
Figure 9C:
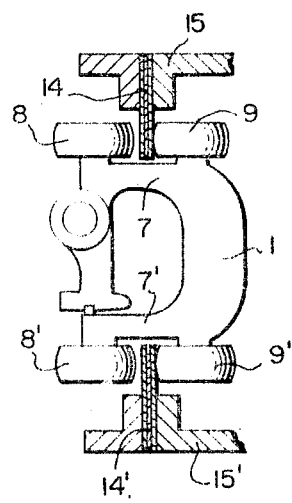
Figure 9B:
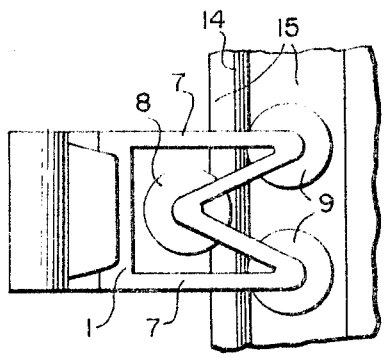

The invention will be further illustrated by reference to the accompanying drawings in which:

FIGURE 1 is a view in cross-section through a guide rail and including a side view of a tenter hook or clip mounted therein, FIGURE 2 is a sectional view through the tenter hook or clip shown in FIGURE 1 taken on line B—B of FIGURE 3, FIGURE 3 is a top plan view of the tenter hook or clip of FIGURE 1, FIGURE 4 is a front view in elevation of a tenter hook or clip looking in the direction of the arrow C in FIGURE 1, FIGURE 5 is a sectional view through a transition point between two successive chain track sections taken on line D—D of FIGURE 6, FIGURE 6 is a top plan view of a transition point between two chain track sections when the chain track runs rectilinearly, FIGURE 7 is a top plan view of a transition point between two track sections, one of the chain track sections being shown angularly positioned relative to the other, FIGURE 8 is a modification of the construction shown in FIGURE 5, FIGURE 9 is a modification of the construction shown in FIGURE 7, FIGURE 9a illustrates a further embodiment of the invention with double rolling surfaces, FIGURE 9b is a top view of the construction shown in FIGURE 9a, FIGURE 9c illustrates another modification of the construction of the invention using double guide rails, FIGURE 10 is a schematic representation of a tenter clip chain track section positioned on one side of a tentering frame, FIGURE 11 is a fragmentary view showing the reversal means for reversing the direction of movement of the tenter clips on the chain track, and FIGURE 12 is a sectional view of the guide rail shown in FIGURE 11.

Referring to FIGURES 1 to 4, a guide rail 14 is formed from a plurality of spring steel bands which are mounted on the edges thereof. The spring steel bands are clamped on the supporting plate or carrier 16 by means of the angular clamping means 15; the set of steel spring bands 14 is continuous and has no seams or joints. On both sides of a portion of the spring steel bands 14 which protrudes beyond the clamping members 15 are positioned the rollers 8 and 9, respectively, of the tenter hook or clip. These rollers counteract, during operation, the generated horizontal tensional forces. As shown in the drawings, the guide rail 14 is positioned between the rollers and there is a small amount of play between the rollers and the rail.

The tenter hook or clip itself is constructed in a conventional manner with two arms 2 which carry a pivotal lever 3 having the gripping edge 4 thereon. The lever 3 is pivotally mounted on the pin or axle 6, and the material to be treated is clamped or gripped between the edge 4 on the lever 3 and the surface 5 on the clip body. The clip body comprises, at the side facing away from the clamped-in material, two arms 7 which support the rollers 9. Positioned between these two arms and closer to the central clip or bearing point at the other side of the flexible guide rail 14 is a single roller 8. The rollers 8 and 9, which counteract the horizontal tensional forces, are mounted in a triangular configuration, two rollers being positioned at the side of the guide rail facing away from the clamped-in material and one roller being positioned at the front side of the guide rail. In this manner, the rollers will, in operation, always have the same traveling direction and are not braked, nor is their traveling direction reversed, if the tenter hook or clip is lifted off the guide rail during operation and possibly abuts against the other side of the track. In order to obtain particularly good running properties, it is important that the bearing surfaces of the rollers 8 and 9, be mounted at the guide rail 14 at the height of the clamped-in material, i.e., at the height of the clamping surface 5.

Mounted below the clamping surface 5 is a vertical roller 10 secured to a web portion of the clip which roller 10 supports the weight of the clip. It is positioned under or at least substantially under the center of gravity of the clip and runs on the horizontal portion of a clamping member 15. The rollers 8 and 9 are not used as chain rollers but, instead, separate chain rollers are provided. For this purpose, two rollers 11 rotatably mounted on supporting bolts are provided at the underside of the clip body; only one of the rollers 11 is illustrated in FIGURE 4. The bolts and rollers, respectively, are connected by means of the side links 12. The side links 13 also are mounted between the supporting bolt of a first tenter hook or clip and a supporting bolt of the following roller of a second clip. The rollers 11, with the two pairs of side links 12 and 13, constitute the chain for driving and moving the clips. The teeth of a driving wheel engage in the gaps in the chain between the rollers 11 at a reversing point of the clip chain. Since the rollers 11 act as chain rollers and are not utilized as traveling rollers, they are not subjected to stresses either by braking or resulting from a different direction of movement and for this reason they may be of a lighter construction.

FIGURES 5 through 7 show the transition point between two successive chain track sections. The two chain track carriers 16 and 16' are contiguous in these figures. Mounted on these carriers are the clamping members 15 and 15', respectively, for the flexible guide rail 14. At the transition point, the carriers 16 and 16' are mounted on separate, generally semicircular discs 21 and 21', respectively. These discs have a semicircular step 25 at the underside thereof, as shown in FIGURE 5. Furthermore, the discs include, at the center thereof, a semicircular recess into which fits a circular cylindrical pivot 19. As noted above, the discs 21 and 21' are not exact semicircles but, instead, are diagonally beveled in the traveling direction of the chain track so that they may pivot about the pin 19. The bevels are provided in accordance with the desired maximum pivot angle of the clip chain track. The steps 25 of the discs 21 and 21', respectively, fit into a circular bore in a plate 22 and are held together by this plate so that they will not be pulled apart in case of any tensile stresses occurring in the longitudinal direction of the chain. The entire assembly at the transition point is mounted on a base plate 23 and is secured thereto by means of side bars or cover plates 24.

The vertically-positioned ends of the clamping members 15 are beveled at the transition point. These bevels or rounded-off portions are identified by the reference numeral 20. The set of spring steel bands 14 abuts against the beveled portions when two successive chain track sections are pivoted relative to each other. In this construction, the flexible guide rail 14 passes essentially over the central point of rotation of the pivotal chain track sections. Due to the beveled portions 20 of the clamping members 15, the set of spring steel bands 14 is positioned freely over a certain distance and is no longer clamped between the clamping members 15. Accordingly, in order to insure that the spring steel bands 14 may have the required rigidity, separate reinforcing members 17 are provided at the transition point, which members extend in the elongation of the vertical jaws of the clamping members 15 and enclose the spring steel bands 14 between them. In this manner, the entire assembly has sufficient rigidity at the transition point while remaining flexible and jointless.

Flexible bands 18 are positioned below the vertical roller 10 at the transition point. They also are positioned in bevels in the horizontal portion of the clamping members 15. This insures that the vertical rollers 10, which support the weight of the clips, can travel from one chain track section to another without passing over any joints which would cause a shock or impact. FIGURE 7 shows the pivoting of two successive chain track sections and the jointless transition for the traveling rollers of the tenter clips between the two sections.

FIGURES 8 and 9 generally correspond to the construction of FIGURES 5 and 7, with the distinction that rigid transition elbows or curves are provided, instead of flexible transition members, which can be freely adjusted in corresponding guides to the respective pivot angle of the chain track carriers. The horizontal portion of the clamping members 15 and 15' includes the arc-shaped recesses 27 positioned concentrically with respect to the central pivot point 19. A flat transition elbow or curve 26 is inserted into these recesses, which elbow connects the two partial curves in the clamping members 15 and 15' with each other, thus bridging the gap between them. The transition elbows or curve 26 forms with the surface of the clamping members 15 and 15', respectively, a planar supporting surface for the vertical roller 10. The width of the transition elbow or curve 26 may be so selected that during pivoting of the chain track sections, the traveling roller 10 will run thereover with certainty. The path of the roller 10 has been indicated in dashed lines in FIGURE 9 and designated by the numeral 28. In this manner, any gap is again eliminated and a quiet operation of the tenter clips is assured.

While it is not specifically illustrated in the drawings that vertical traveling rollers of the tenter clips can be mounted on both sides of the guide rail 14, FIGURE 9 illustrates, at the right-hand side of the guide rail in dashed lines, the conditions prevailing in case the successive chain track sections are pivoted in a different direction, i.e., where the gap between the clamping members 15 and 15' becomes greater than it otherwise is. Here again, it is apparent that the transition elbow or curve 26' remains at all times below the path 28' of the traveling rollers 10 and the gap is bridged. Further, different possibilities for the transition members between two successive chain track sections may be utilized if, as noted above, the vertical traveling rollers of the tenter clips are mounted on both sides of the vertical guide rails.

The construction of the present invention eliminates any impact points or joint abutments and gaps for the traveling rollers of the tenter clips and, thus, results in an extremely quiet operation of the rollers. No harmful shocks or impacts can be applied to the rollers and the danger that the traveling rollers are braked or that the direction of movement thereof is reversed is eliminated. Accordingly, considerably higher traveling speeds of the tenter hooks or clips may be achieved and the rollers themselves can be made of a lighter construction. The apparatus of the invention is susceptible to a number of variations; for example, the continuous guide rail can be utilized for tenter hooks or clips having roller bearings where a guide rail is required for the clips both at the top and bottom thereof.

As shown in FIGURES 9a, 9b and 9c, the rollers 8, 8', 9, and 9' for the horizontal guide of the clip chain, in contrast to the embodiments of FIGURES 1 to 9, may be positioned in a manner such that the arms 7 and 7', respectively, are mounted on the clip body 1, each of which arms carries rollers 8, 9 and 8' and 9', respectively, for the horizontal guide of the clip chain.

In FIGURES 9a and 9b, the guide rail 14 projects on both sides beyond the clamping members 15 so that two guide paths each are provided on which the rollers 8, 9 and 8' and 9', respectively, roll. The rollers 8 and 9, as well as the rollers 8' and 9' have the same distance from the clamping point, which is formed by the elements 3 and 5, for the material to be stretched or tentered and a perfect guide is thus established for the entire movement of the clip chain.

In FIGURE 9c, as compared to the guide shown in FIGURES 9a and 9b, guide rails 14 and 14', respectively, are provided which are secured in position by means of corresponding clamping members 15 and 15', respectively. In this construction, the arms 7 and 7', respectively, are again positioned on both sides of the clip body 1 and the rollers 8, 9 and 8' and 9', respectively, are supported thereagainst. A safe, perfect guide of the clip bodies is assured also by means of this construction and any tilting of the clips is effectively prevented.

Another feature of the present invention is that at one end of the clip chain track, at the reversing point thereof, the flexible guide rail extends continuously from the inside track to the outside track. Accordingly, a jointless guide rail is established in this part of the reversal and a drive for the clip chain, by means of a gear, is provided only at one reversing point of the endless chain. In this manner, further points of impact in the course of the clip chain are eliminated or reduced to a degree inherent in the driving means.

FIGURE 10 schematically shows the clip chain track as it appears on one side of a tentering frame. The chain track includes one forwardly extending and one returning part. The track is composed of several contiguous sections, two of which have been identified with the reference numerals 16 and 16'. The contiguous sections may be pivoted, if desired, about the central pivot point 19 so that they occupy different angular positions with respect to each other. The guide rail 14 for the rollers of the tenter clips has the path indicated in dashed-dotted lines and passes over the central pivot point 19. This construction is identical with that described above. At one end of the endless clip chain, a gear 32 is mounted at the reversing point, the gear serving to drive the clip chain and engaging with the chain rollers of the tenter clips in the manner described above. The guide rail 14 extends to a point adjacent the gear 32 both for the inside and outside track. In contrast, no reversing gear is provided at the other reversing point of the clip chain track but the guide rail for the rollers of the tenter hooks extends continuously from one track to the other at the curved section 34.

FIGURE 11 shows the construction of the clip track reversal means using the gear 32. The teeth of the gear are identified by reference numeral 33. The running-in jointless guide rail 14 is clamped between the clamping members 15 in the manner described above. Shown on the horizontal portion of the angle strip 15 is the path 28 of the rollers 10 supporting the weight of the clips. Also shown are several clips 1 with the chain rollers 11 thereof and the side links 13 connecting the clips with each other. The teeth 33 of the gear 32 engage between the chain rollers 11 of the clips. Here again, within the area or zone of the reversing wheel 32, the weight of the clips is supported by the rollers 10, which roll on the path 28. The rollers for counteracting the horizontal tensional forces of the clips, i.e., the rollers 8 and 9, are mounted completely freely and, after leaving the straight part of the guide rail 14, continue to rotate without impediment. There is no abrupt stopping of the rollers and also no reversal of the direction of rotation thereof. Also, the chain rollers 11 are neither braked nor brought to a standstill by the gear because, during the movement of the clip chain on the track parts 15, they are not caused to rotate and they can, therefore, be engaged by the teeth 33 of the gear 32 without adverse effect.

The lower portion of FIGURE 11 illustrates the reversal on the other end of the clip chain track, and the continuous, jointless guide track is readily apparent therefrom. The run-in and run-out parts of the guide rail 14 are connected to the curved portion 34. On the straight portion, the guide rail 14 is clamped in between the angle strips 15. This manner of clamping also may be contined over the curved portion as a ring. Moreover, flexible reinforcing bands 17 also may be provided, in the manner indicated above, which bands supply necessary rigidity to the curved portion 34 of the guide rail. Of course, it is possible to effect clamping of the guide rail in the curved portion 34 in a different manner. Since no horizontal tensional forces at the clips are generated in the curved portion of the reversal and since any stresses are caused only by centrifugal forces, the stresses occurring at the curved portion 34 are extremely small. The rollers 8 and 9 still abut against the guide rail 34 from both sides with a small amount of play and contact the elongated portion of the guide rail 14 during the reversal; no braking or impacts will occur. The clips themselves and the connecting side links 13 thereof are shown schematically. Mounted at the underside of each of the clips is a roller 10 which supports the weight of the clips. The path of the roller on the angle strip 15 and on the ring constituting the reversal is shown at 28 in dashed-dotted lines.

It will be obvious to those skilled in the art that many modifications may be made within the scope of the present invention without departing from the spirit thereof, and the invention includes all such modifications.

What is claimed is:

1. A chain track assembly for tenter clips comprising a substantially vertical flexible and jointless guide rail, a plurality of tenter clips guided by the rail and having roller means positioned adjacent the rail on both sides of the latter, clamping means abutting opposite sides of said guide rail, and carriers supporting said clamping means, said carriers being adapted to be angularly positioned relative to one another, said clamping means being interrupted between adjacent carriers, the ends of said clamping means being beveled so the guide rail can conform to the angle between adjacent carriers and the associated clamping means.

2. A chain track assembly as defined in claim 1 including flexible reinforcing means for supporting the rail between adjacent carriers and the associated clamping means.

3. A chain track assembly for tenter clips comprising a substantially vertical flexible and jointless guide rail, a plurality of tenter clips guided by the rail and each having roller means positioned adjacent the rail on both sides of the latter, each tenter clip including a further roller, and angular clamping members engaging and supporting the guide rail, one of the clamping members having a horizontal portion constituting a supporting surface for said further roller on each of the tenter clips.

4. A chain track assembly for tenter clips comprising a substantially vertical flexible and jointless guide rail, a plurality of tenter clips guided by the rail and having roller means positioned adjacent the rail on both sides of the latter, each tenter clip including a further roller, angular clamping members engaging and supporting the guide rail, carriers supporting said clamping members, the clamping members being interrupted between angularly positioned carriers, and flexible means connecting a horizontal part of adjacent clamping members to form a continuous supporting surface for said further roller of each of the tenter clips.

5. A chain track assembly for tenter clips comprising a substantially vertical flexible and jointless guide rail, a plurality of carriers, clamping members supported by said carriers and engaging and supporting said guide rail, a plurality of tenter clips guided by the rail and having roller means positioned adjacent the rail on both sides thereof, means for interconnecting said carriers for pivotal movement about a pivot axis including a pair of elongated arcuate slots formed in adjacent clamping members concentric with said pivot axis, and elongated arcuate connecting means having the opposite ends thereof disposed within the arcuate slots formed in the adjacent clamping members.

6. A chain track assembly for tenter clips comprising a substantially vertical flexible and jointless guide rail, a plurality of tenter clips guided by the rail and having roller means positioned adjacent the rail on both sides of the latter, the guide rail extending continuously through a substantially semi-circular curved section of the track wherein the direction of travel of the clips is reversed, and flexible reinforcing bands clamped against the rail in the curved section.

7. A chain track assembly for tenter clips comprising a substantially vertical flexible and jointless guide rail, a plurality of tenter clips guided by the rail and each having roller means positioned adjacent the rail on both sides of the latter, each tenter clip including a further roller, the guide rail extending continuously through a substantially semi-circular curved section of the track wherein the direction of travel of the clips is reversed, chain links connecting the clips, a drive gear positioned adjacent the curved track section for engaging and driving the chain links, and means defining supporting surfaces for said further rollers which support the weight of the clips and extending continuously through the curved section of the track.

References Cited

UNITED STATES PATENTS

| | | |
|---|---|---|
| 127,731 | 6/1872 | Bailey. |
| 527,441 | 10/1894 | Muir. |
| 3,123,854 | 3/1964 | Aykanian _____ 26—57 XR |
| 3,148,409 | 9/1964 | Bruckner. |
| 3,172,151 | 3/1965 | Glossmann. |
| 3,221,416 | 12/1965 | Smith. |
| 3,256,558 | 6/1966 | Andersen et al. |
| 3,303,528 | 2/1967 | Gageur et al. |

FOREIGN PATENTS

| | | |
|---|---|---|
| 539 | 1856 | Great Britain. |
| 433,700 | 8/1935 | Great Britain. |
| 694,192 | 7/1940 | Germany. |

ROBERT R. MACKEY, Primary Examiner

U.S. Cl. X.R.

18—1